US006023201A

United States Patent [19]

Lamesch et al.

[11] Patent Number: 6,023,201

[45] Date of Patent: Feb. 8, 2000

[54] ELECTRICAL SIGNAL TRANSMISSION DEVICE PROTECTED AGAINST ELECTROMAGNETIC INTERFERENCE

[75] Inventors: Stéphane Lamesch, La Garenne Colombes; Jean-Louis Braut, Chatou; Alain Le Mehaute, Gif sur Yvette; Denis Cottevieille, Montreuil, all of France

[73] Assignee: Alcatel CIT, Paris, France

[21] Appl. No.: 08/925,728

[22] Filed: Sep. 9, 1997

[30] Foreign Application Priority Data

Sep. 9, 1996 [FR] France .................................. 96 10963

[51] Int. Cl.[7] ................................ H01P 3/06; H04B 3/28

[52] U.S. Cl. ................................ 333/12; 333/33; 333/206

[58] Field of Search ................................ 333/12, 181, 33, 333/206, 207, 237, 243, 245; 174/28, 36

[56] References Cited

U.S. PATENT DOCUMENTS

| | | | |
|---|---|---|---|
| 2,038,240 | 4/1936 | Schelkunoff | 333/12 |
| 2,419,855 | 4/1947 | Roosenstein | 333/243 X |
| 2,438,913 | 4/1948 | Hansen | 333/206 |
| 2,577,510 | 12/1951 | Cohn | 333/206 |
| 2,594,854 | 4/1952 | Bloch | 333/12 |
| 4,161,704 | 7/1979 | Schafer | 333/33 |
| 4,743,725 | 5/1988 | Risman | 333/12 |

FOREIGN PATENT DOCUMENTS

| | | |
|---|---|---|
| 816428 | 10/1951 | Germany . |
| 2103427 | 2/1983 | United Kingdom . |

OTHER PUBLICATIONS

W. A. Davis et al, "Coaxial Bandpass Filter Design", *IEEE Transactions on Microwave Theory and Techniques*, vol. 19, No. 4, Apr. 1971, New York, pp. 373–380.

Patent Abstracts of Japan, vol. 8, No. 277 (E-285) [1714], Dec. 18, 1984 corresponding to JP 59 144201 A (Matsushita Denki Sangyo K.K.) dated Aug. 18, 1984.

*Primary Examiner*—Seungsook Ham
*Attorney, Agent, or Firm*—Sughrue, Mion, Zinn, MacPeak & Seas, PLLC

[57] ABSTRACT

An electrical signal transmission device includes a core and an outer conductor separated by a dielectric. To eliminate external radiated interference, for which the device behaves like a receiving antenna, the core, the outer conductor and/or the dielectric feature discontinuities forming impedance discontinuities. The discontinuities are chosen to prevent propagation towards the core of external interference waves in a particular range of frequencies.

15 Claims, 4 Drawing Sheets

FIG_5
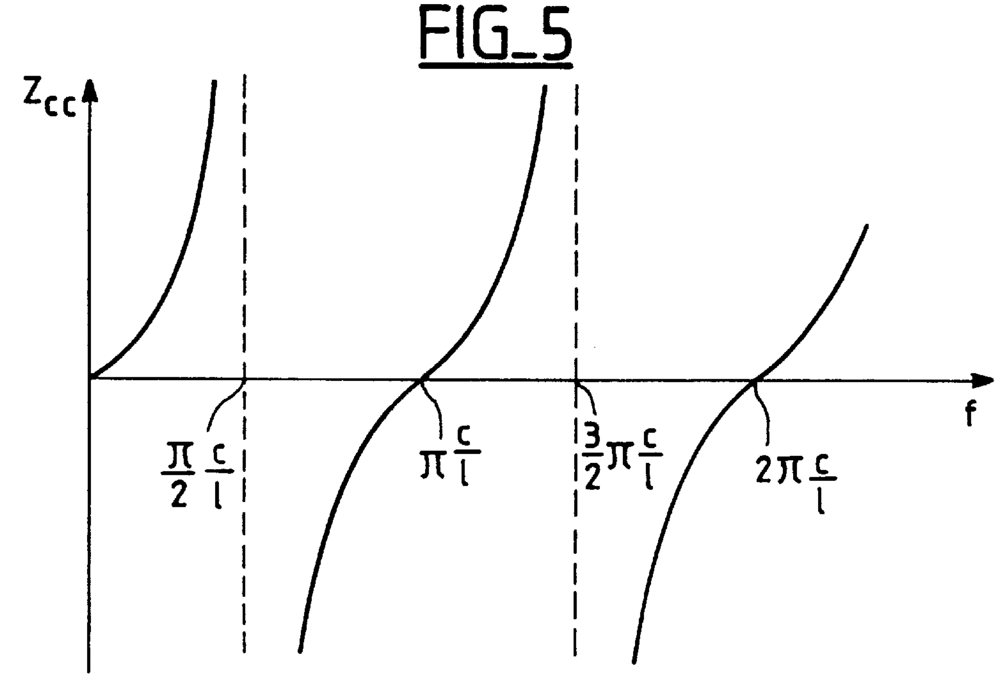
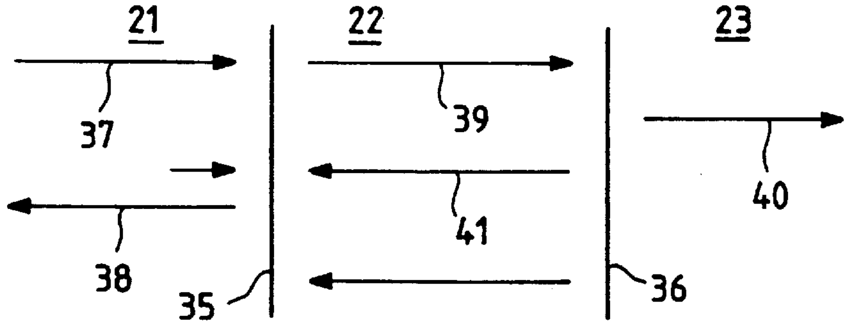
FIG_6
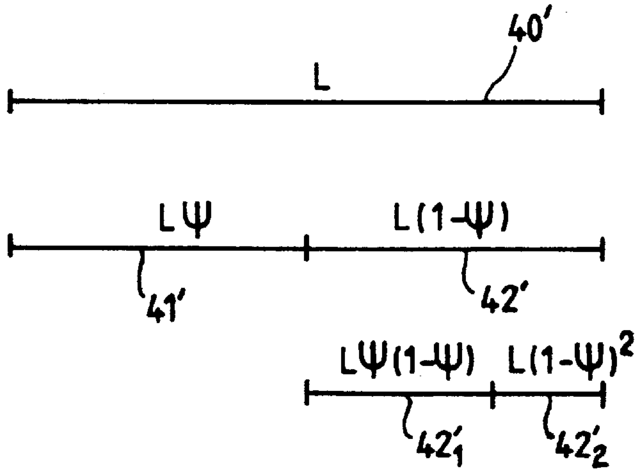
FIG_7

ELECTRICAL SIGNAL TRANSMISSION DEVICE PROTECTED AGAINST ELECTROMAGNETIC INTERFERENCE

BACKGROUND OF THE INVENTION

1. Field of the Invention

The invention concerns an electrical signal transmission device protected against electromagnetic interference. It also concerns a method of protecting a cable against electromagnetic interference.

2. Description of the Prior Art

The density of electromagnetic waves transmitted by various means, including by radio, is constantly increasing due to the expansion of telecommunications and the increasing number of radio and television transmitters. This increase in density leads to an increased risk of interference for equipment of all kinds. The commonest example of pollution of this kind is interference on signal transmission cables arising from electromagnetic waves, the cables generally constituting receiving antennas.

Inductor and capacitor filters have been used until now to protect apparatus or equipment connected to the cables. These filters are relatively complicated and costly. The complexity and the cost increase with the bandwidth of the signals to be eliminated.

European patent application 624 885 in the name of Alcatel Cable describes a cable featuring intrinsic filtration of electromagnetic interference in the frequency band below 1 GHz. This coaxial cable comprises a metal core surrounding by at least two layers, one of which is a layer of dielectric material and the other of which, disposed between the core and this layer of dielectric material over at least a portion of the length of the cable, is a layer of a composite semiconductor material comprising an insulative matrix and a non-doped conductive polymer with conjugate bonds. This cable can eliminate the need to use discrete filters. However, the upper limit of 1 GHz is not suited to all applications.

The invention is aimed at providing a signal transmission device combating electromagnetic interference over a wide range of frequencies and that is simple and economic to manufacture. By "electromagnetic interference" is meant radiated interference detected by the cable acting as an antenna. Interference normally transmitted by the cable, that is to say by its core, is not considered here.

SUMMARY OF THE INVENTION

In the device of the invention, the outer conductor and/or the dielectric have discontinuities forming impedance discontinuities, the discontinuities being chosen to prevent the propagation towards the core of external interference waves in a particular range of frequencies.

It has been found that this eliminates detected external radiated interference although the signals transmitted normally by the cable are virtually unaffected.

In the preferred embodiment of the invention the discontinuities form a plurality of impedances with successive different values, the dimensions of the impedances formed between the successive discontinuities having varying values forming a sequence filtering waves that can propagate towards the core with frequencies in a particular range imposed by the sequence.

The succession of impedances of different dimensions eliminates a wide band of frequencies.

The filtering effect is based on the fact that at the limit between two different impedances a signal at a given frequency is partly transmitted and partly reflected. The reflection coefficient depends on the succession of impedances downstream of the discontinuity. To eliminate a wide band of frequencies, for example from 1 kHz to 18 GHz, it is necessary to provide an appropriate distribution of impedances. It has been found that the number of impedances needed to filter a wide spectrum of interfering frequencies can be limited to a reasonable number. In one example this number is equal to 17.

At the discontinuities the interfering waves are mostly reflected, which prevents them propagating in the cable.

The impedance discontinuities or steep impedance gradients are advantageously obtained by alternating high impedances and low impedances. The ratio between the high impedances and the low impedances is greater than four, for example, and preferably in the order of ten. In one embodiment there are only two values in the succession of impedances.

The succession of discontinuities is preferably such that it forms interference filters eliminating said particular range of frequencies.

The impedances needed to create the filtering effect (interference or otherwise) form a succession either in an axial direction of the coaxial device or in a radial direction.

In one embodiment, which concerns an axial, or longitudinal, succession of different impedances and which applies more particularly to a coaxial device, the core has successive parts of different diameter. For example, the diameter of the core has two different values and the successive elements have varying lengths to create the series of impedances producing the required filter effect.

As an alternative to this, the outer conductor has successive parts with different inside diameters. In this case, the central conductor, or core, preferably has a constant diameter. It is nevertheless possible to combine variations in the diameter of the core and in that of the outer conductor.

These embodiments apply more particularly to connectors for use between a cable subject to electromagnetic interference and an equipment to be protected against such interference.

In another embodiment, which applies more particularly to a cable incorporating protection against electromagnetic interference, two successive impedances are distinguished by the configuration of their outer conductors. For example, one impedance has an unapertured outer conductor that completely surrounds the corresponding section of cable and the outer conductor of the next section has apertures in it. The latter conductor can be reduced to a single wire connecting the unapertured outer conductors of the preceding section and the next section. As in the other examples, the lengths of the various sections differ and the sections are disposed in a sequence imposed by the frequencies to be eliminated.

The lengths of the various sections are imposed primarily by the required filter effect. Other constraints may apply, however. In particular, it is necessary to minimize the total length. To this end, the lengths of the sections can be chosen in accordance with a fractal type distribution.

In one variant, which applies to all the embodiments described hereinabove, the impedance variation is obtained by disposing dielectric materials with different permittivity and/or permeability in successive sections.

Although the preferred application is to low-pass filtering, the invention applies to all types of filtering, i.e. it can also provide high-pass filtering and band-pass filtering.

The features of the invention, enabling frequency filtering, can be combined with amplitude filtering. This latter filtering is preferably effected by using between the core and the outer conductor a threshold characteristic dielectric material, i.e. a material that is insulative below a particular value of the electric field and conductive above this value. In this way interference having an amplitude greater than a particular value is eliminated by shunting it to ground, if the outer conductor is connected to ground. The threshold characteristic material completely or partly fills the space between the outer conductor and the core.

Moreover, the configuration of the core or of the outer conductor is such that it includes parts with a small radius of curvature so as to generate a "spike effect" to lower the external electric field threshold from which the dielectric material becomes conductive Other features and advantages of the invent will emerge from the description of some embodiments of the invention given with reference to the accompanying drawings.

BRIEF DESCRIPTION OF THE DRAWINGS

FIG. 5 is a diagram showing the variation of impedance as a function of frequency.

FIG. 6 is a diagram used to explain interference filtering.

FIG. 7 is a diagram used to explain a fractal distribution for choosing impedance lengths.

DETAILED DESCRIPTION OF THE PREFERRED EMBODIMENTS

Figure 1:
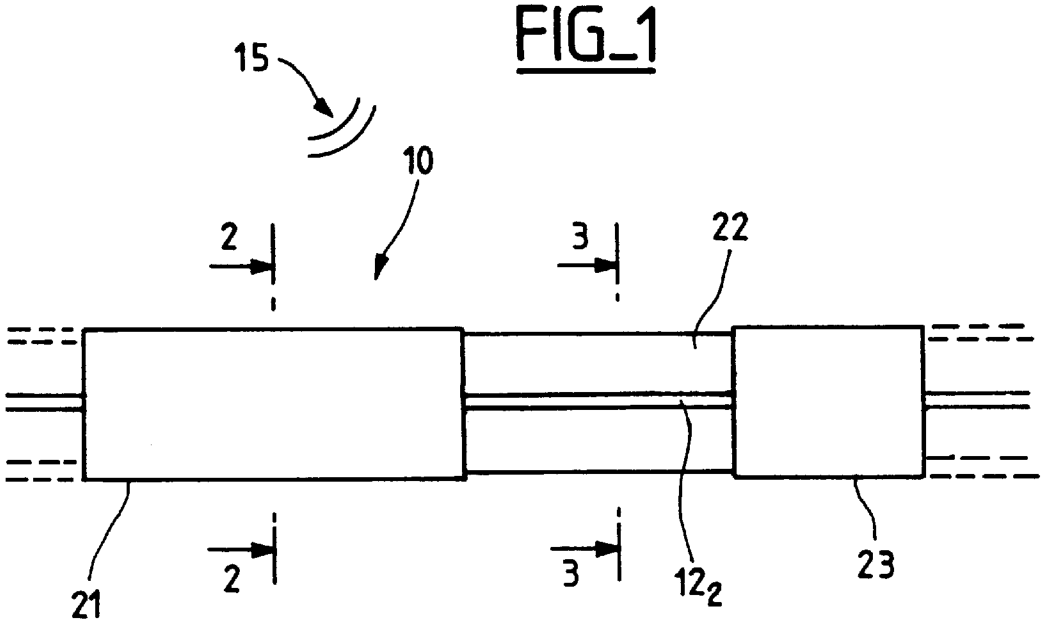
FIG. 1 shows a portion of a cable in accordance with the invention.

The embodiment of the invention to be described with reference to FIGS. 1 to 3 concerns a coaxial cable 10 having a core 11, or central conductor, an outer conductor 12 and a dielectric 13 between the core 11 and the conductor 12.

Over at least a portion of its length the cable is divided into sections with different impedances so as to achieve interference filtering to filter (i.e. to eliminate) electromagnetic interference 15 detected by the cable operating as a receiving antenna for the interference 15.

In this example the core 11 is an 11.2 mm diameter copper wire and the outer conductor 12 is a 0.05 mm thick copper tape (flat ribbon) in contact with the outer surface $\mathbf{13}_1$ of the polyethylene dielectric 13. The outside diameter of the polyethylene ring is 21 mm.

To achieve the filtering mentioned above, over at least a portion of its length the cable 10 is divided into sections with varying impedances, two successive sections having significantly different impedances. FIG. 1 shows three sections 21, 22, 23. These sections, or cells, differ from each other in terms of their length and the configuration of their outer conductor 12.

Figure 2:
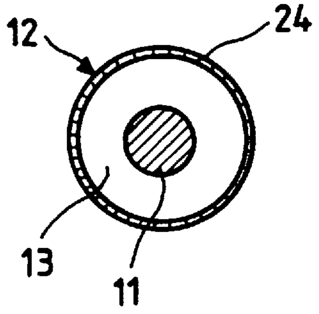
FIG. 2 is a section taken along the line 2—2 in FIG. 1.
Figure 3:
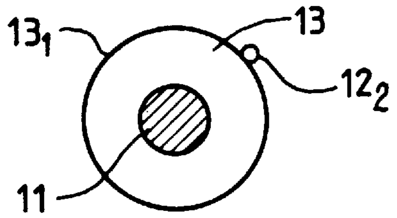
FIG. 3 is a section taken along the line 3—3 in FIG. 1.

The outer conductor 12 of the cells 21 and 23 is in the form of an unapertured sleeve 24 which therefore surrounds the dielectric completely (FIGS. 1 and 2).

The outer conductor of the cell 22 is just a 1.2 mm diameter wire $\mathbf{12}_2$ parallel to the axis of the cable connecting the sleeves of cells 21 and 23. In other words, most of the outer surface of the polyethylene ring 13 is bared in cell 22.

In one variant a conductive varnish is used in place of an outer conductor in the form of a tape, in particular of copper.

The succession of cells is such that each has an impedance at its input which is significantly different from the input impedance of the next cell. In one embodiment there are only two impedance values.

The table below shows a sequence (or pattern) of 17 successive impedances having the following characteristics:

TABLE 1

| cell | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| length (cm) | 50 | 1 | 15 | 7 | 79 | 63 | 91 | 55 | 67 | 85 | 33 | 35 | 19 | 55 | 1 | 100 | 50 |
| Zc (ohms) | 23 | 300 | 23 | 300 | 23 | 300 | 23 | 300 | 23 | 300 | 23 | 300 | 23 | 300 | 23 | 300 | 23 |

This sequence is an alternation of input impedances of 23 ohms and 300 ohms.

The invention is based on the fact that the discontinuities created by the succession of different impedances cause reflections that prevent the propagation of interference waves.

For a better understanding of how the reflection occurs, it should be borne in mind that a coaxial cable having a core of diameter a and an outer conductor with an inside diameter of b has a characteristic impedance $Z_0$ defined by the following equation:

$$z_0 = \frac{\eta}{2\pi} \times \ln\left(\frac{b}{a}\right) \tag{1}$$

In the above equation η is the wave impedance defined by the following equation:

$$\eta = \sqrt{\frac{\mu}{\varepsilon}} = \sqrt{\frac{\mu_r}{\varepsilon_r}} \times \sqrt{\frac{\mu_0}{\varepsilon_0}} \tag{2}$$

In the above equation, $\mu$ is the permeability of the dielectric between the core and the outer conductor, $\epsilon$ is its permittivity, $\mu_0$ is the permeability of a vacuum and $\epsilon_0$ is the permittivity of a vacuum.

A wave of frequency f propagating in a coaxial cell has a wavelength $\lambda_g$ with the following value:

$$\lambda_g = \frac{2\pi}{\beta} = \frac{2\pi}{\varpi \times \sqrt{\varepsilon\mu}} = \frac{c}{f \times \sqrt{\varepsilon_r \mu_r}} \quad (3)$$

In the above equation, c is the velocity of light.

Figure 4:
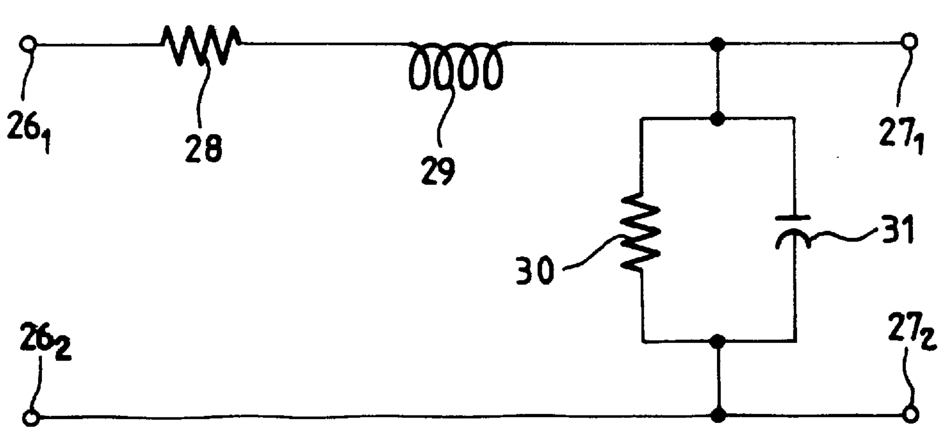
FIG. 4 is the equivalent circuit diagram of a section of cable.

A cable can be represented by the equivalent circuit from FIG. 4, i.e. with two input terminals $\mathbf{26}_1$, $\mathbf{26}_2$ and two output terminals $\mathbf{27}_1$, $\mathbf{27}_2$. Between the terminals $\mathbf{26}_1$ and $\mathbf{27}_1$ is a resistor 28 that represents the resistance per unit length of the metal conductors in series with an inductor 29 which represents the inductance of the conductors. In the FIG. 4 representation, one terminal of the inductor 29 is connected to the resistor 28 and the other to the output terminal $\mathbf{27}_1$.

Between the terminals $\mathbf{27}_1$ and $\mathbf{27}_2$ there are a conductance 30 which is the conductance of the dielectric between the core and the outer conductor and a capacitor 31 in parallel with the conductors 30 which represents the capacitor formed by the two armatures, i.e. the core and the outer conductor, and the dielectric.

The impedance of each section of line or cable can be calculated from these parameters and from this equivalent circuit diagram. Accordingly, the input impedance $Z_{CC}$ of a section of lossless line of impedance $Z_o$ of length 1 terminated by a short-circuit is given by the following equation:

$$Z_{CC}=j.Z_0.\tan h(\gamma l),\ \gamma=\alpha+j\beta=\alpha+j\omega/c \quad (4)$$

As the line is lossless:

$$Z_{CC}=j.Z_0.\tan(\omega l/c) \quad (5)$$

This impedance therefore varies as a function of frequency, as represented by the FIG. 5 diagram in which the frequency f is plotted on the abscissa axis and the impedance $Z_{CC}$ on the ordinate axis.

This diagram shows that the impedance is infinite when the length 1 of the line is equal to an odd number of quarter-wavelengths and zero when the length 1 of the section of line is equal to an even number of quarter-wavelengths.

It can readily be shown that if the section of line is open-circuit, rather than short-circuited, the open-circuit impedance $Z_{c0}$ has zeros (0) for an odd number of quarter-wavelengths and poles (infinite values) for an even number of quarter-wavelengths.

It can therefore be seen that the length of each section determines the frequencies filtered.

Moreover, at the transition between two impedances (the value of which depends on the frequency), an incident wave is reflected, i.e. returned towards the source, without propagating downstream. The reflection coefficient R is given by the following equation:

$$R = \frac{Z_g - Z_e}{z_g + z_e} = \frac{\text{reflected wave}}{\text{incident wave}}$$

In the above equation, $Z_g$ is the impedance at the source, i.e. at the upstream end, and $Z_e$ is the impedance of the line in the input plane, i.e. the downstream side impedance.

Given that a cable or device in accordance with the invention comprises a multiplicity of transitions, it will readily be understood that, overall, the filter power depends on the set of transitions. This property will be better understood from the description of FIG. 6 in which the line 35 represents the plane separating the cells 21 and 22 and the line 36 represents the plane separating the cells 22 and 23. It can be seen that an incident wave 37 is partly reflected (arrow 38) and partly transmitted (arrow 39). Similarly, at the transition 36 the wave 39 is partly transmitted (arrow 40) and partly reflected (arrow 41). The overall reflected wave will therefore consist in the superposition of all the partial reflections at the transitions.

The choice of the lengths of the various sections is imposed primarily by the limiting curve of the frequencies to be rejected. Nevertheless, this constraint leaves some latitude for choice; the various lengths can therefore be chosen to satisfy other conditions; in particular, the total length of the filter can be minimized.

One example of a fractal structure distribution for achieving this aim is described below with reference to FIG. 7. However, this example does not concern the cable from FIG. 1 in which the dielectric material is the same all along the cable. It concerns a cable or a connector that has sections having a different permittivity (or permeability) of the dielectric.

A subdivision factor, for example 0.54 or 6, is chosen and the total length 40' of a filter pattern is divided into two sections 41' and 42'. The first section 41' has a length LΨ (L is the total length of the pattern and Ψ is the subdivision factor) and its permittivity $\epsilon_r$ is equal to the permittivity of the dielectric. The second section 42' has a length L (1−Ψ) and its permittivity is $\epsilon_r\Psi/(1-\Psi)$. In this way, the two sections, which are of unequal length, store the same energy, the shorter section having an increased permittivity of the dielectric to compensate its shorter length.

Each of the sections 41' and 42' is then subdivided in the same manner. Thus the section 42' is divided into sections $\mathbf{42'}_1$ and $\mathbf{42'}_2$. The length of section $\mathbf{42'}_1$ is $L(1-\Psi)\Psi$ and the permittivity of the dielectric is $\epsilon_r\Psi/(1-\Psi)$; the length of section $\mathbf{42'}_2$ is $L(1-\Psi)^2$ and the permittivity of its dielectric is:

$$\varepsilon_r \frac{\Psi^2}{(1-\Psi)^2}$$

Other fractal distributions can of course be used, for example a Cantor distribution.

In addition to choosing the lengths of the various sections, the order of succession of the sections must be determined. This order is determined empirically to obtain the required filtering; for this empirical determination it is of course possible to carry out digital simulations to move towards the required filter spectrum by successive approximation.

Figure 8:
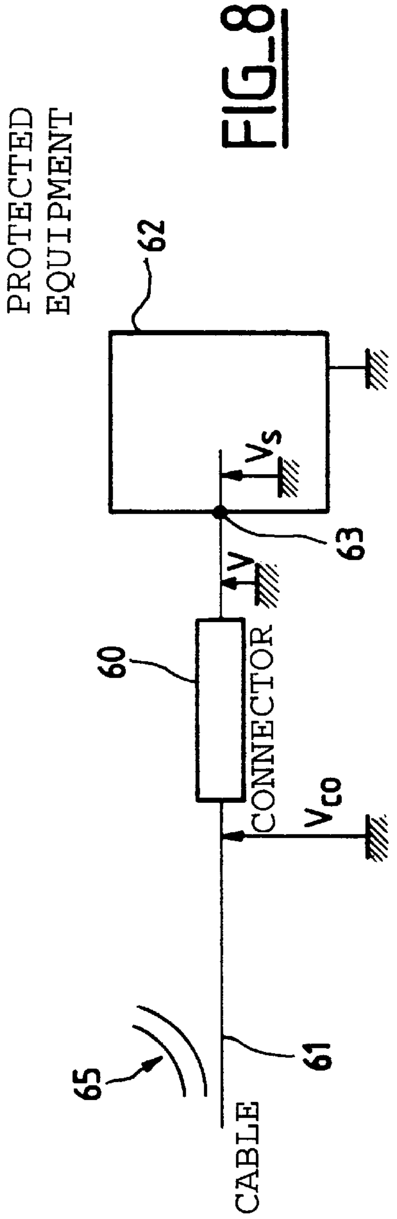
FIG. 8 is a diagram showing the use of a connector in accordance with the invention.

The use of the invention to produce a connector 60 (FIG. 8) for use between a cable 61 and an apparatus or equipment 62 the input (or output) 63 of which is connected to the cable 61 will now be described with reference to FIGS. 8 through 10. The aim of the connector 60 is to eliminate interference 65 detected by the cable 61 operating as a receiving antenna for the interference waves.

Note that, although a connector 60 external to an apparatus 62 to be protected is shown here, this connector or filter 60 can of course be accommodated inside the apparatus 62.

In this example, the connector 60 has a peak limiter function in addition to its function of filtering interference frequencies, i.e. the function of limiting the amplitude of the signals applied to the input 63.

Figure 9:
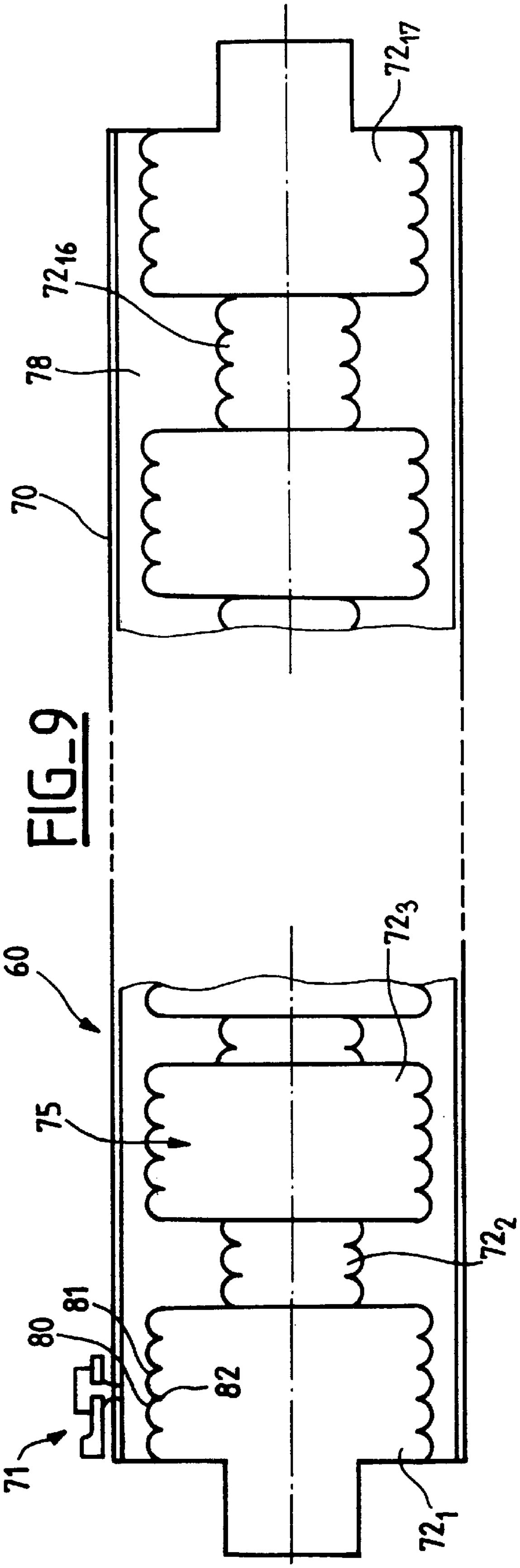
FIG. 9 is a diagram showing a connector in accordance with the invention.

Referring to FIG. 9, the filter connector 60 is in the form of a cylinder approximately 200 mm long with an outside diameter of 25 mm. It has an outer sleeve 70 constituting the outer conductor of the connector, the overall construction of which is coaxial. The outer conductor 70 is connected to ground by means 71 such as a screw and a tag.

As in the example described with reference to FIGS. 1 to 3, the filter effect is obtained by providing a succession of cells of varying impedance along the length of the connector 60. For example, the input impedance of the first cell $\mathbf{72}_1$ is 6 ohms, the input impedance of the second cell $\mathbf{72}_2$ is 60 ohms, the input impedance of the third cell $\mathbf{72}_3$ is equal to the input impedance of the cell $\mathbf{72}_1$, i.e. to 6 ohms, etc. There are 17 cells in this example.

The subdivision into cells with alternating input impedances is obtained by the configuration of the central conductor or core.

Accordingly, the first cell $\mathbf{72}_1$ has a maximal outside diameter of 20.2 mm and a length 20 mm. In the second cell $\mathbf{72}_2$ the maximal diameter of the core 75 is 5.6 mm and the length of this cell $\mathbf{72}_2$ is 9 mm. The subsequent odd cells have a core outside diameter equal to that of the cell $\mathbf{72}_1$ and the subsequent even cells have a core diameter equal to the diameter of the core of the cell $\mathbf{72}_2$.

In this example, all the odd cells, of larger diameter, have the same length of 20 mm, whereas the even cells are of varying length. As described above, these parameters are chosen in accordance with the required filter effect. Additionally, the odd cells have the same input impedance (6 ohms) while all the even cells have a significantly higher input impedance (60 ohms).

This connector eliminates interference frequencies greater than 10 kHz and up to 18 GHz.

The dielectric material 78 filling the space between the core 75 and the outer conductor 70 is preferably a non-linear material such as a polyaniline or a zwitterion. By "non-linear material" is meant a material that is insulative for an electric field value less than a particular threshold and conductive when the electric field exceeds this threshold. In this way, for electric fields exceeding the threshold, the signal is shunted to ground by the connection 71.

This provides additional amplitude protection. A typical example is lightning protection.

More generally, however, the aim is to protect the equipment 62 (FIG. 6) against signals having an amplitude greater than a particular threshold $V_S$. It is not always possible to select the material 78 such that it becomes conductive from an electric field threshold corresponding to the maximal permissible voltage at the input 63 of the equipment 62, the breakdown threshold of the material 78 intrinsically being at a relatively high level.

To use the properties of the material 78 for "amplitude" protection of the equipment 62, the core 75 and/or the inside surface of the outer conductor 70 is or are configured with edges or points. These edges, or areas with a small radius of curvature, locally increase the value of the electric field in the material 78 and therefore significantly reduce the external field threshold from which the material 78 becomes conductive. To be more precise, because of the spike effect, the applied electric field is locally increased, at the point, by a factor of 10 to 100. This reduces the breakdown threshold of the material 78 by a factor of 10 to 100, the threshold being measured by the overall electric field rather than the local electric field (at the edges or points).

In the FIG. 9 example, the points or edges are formed by corrugations on the outside surface of the core 75. Accordingly, in section on an axial plane, the outside surface of the core for each cell is not a straight line segment but a series of 0.4 mm diameter semi-circles 80, 81. A spike effect is therefore produced by the semi-circles 80, 81 and by the circular edges 82 where the semi-circles join together.

Figures 10, 11A, 11B, 12, 13:
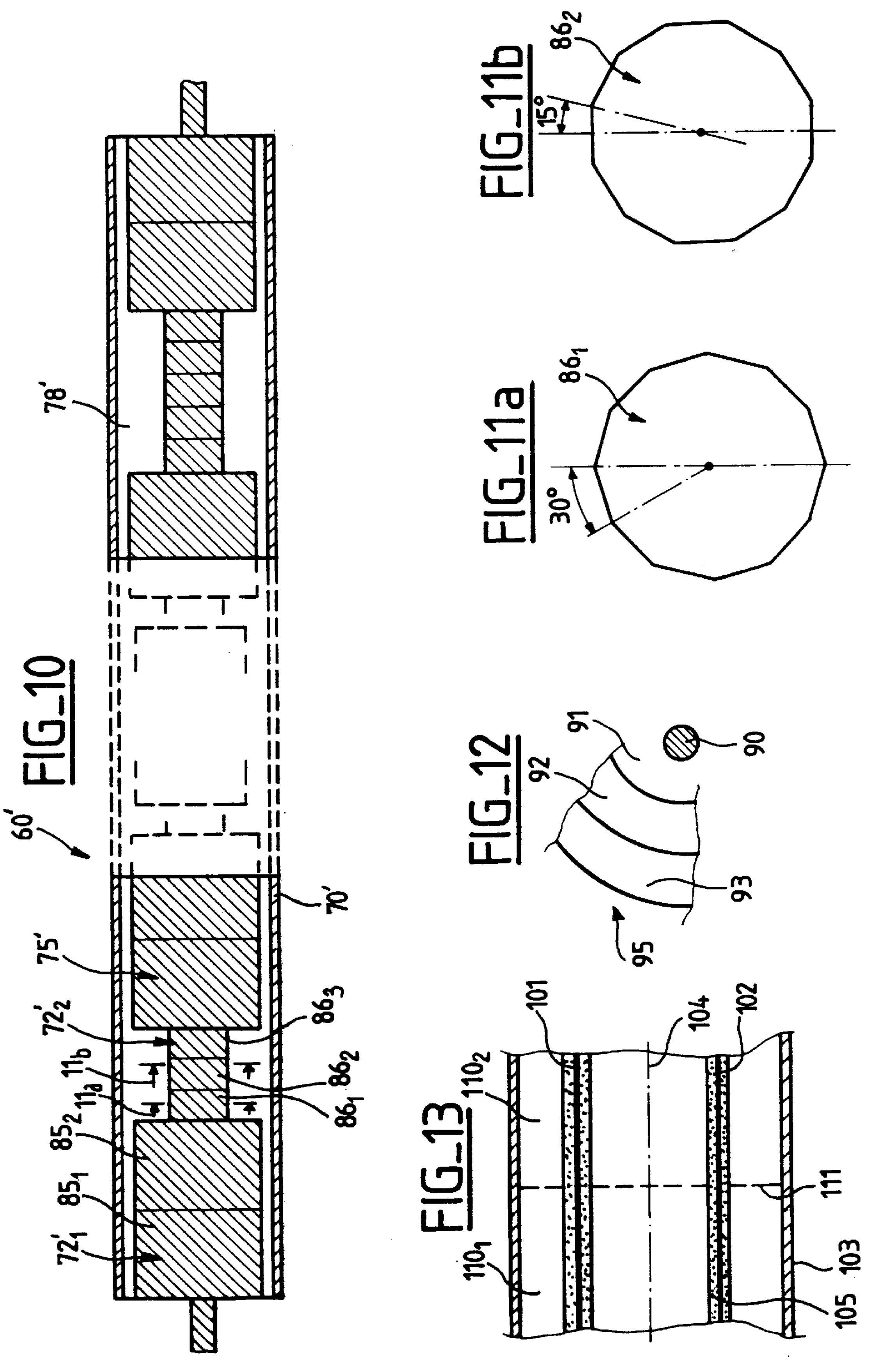
FIG. 10 is a diagram corresponding to a variant of FIG. 9.
FIG. 11*a* is a section taken along the line 11*a* in FIG. 10.
FIG. 11*b* is a section taken along the line 11*b* in FIG. 10.
FIG. 12 is a diagram showing one variant.
FIG. 13 is a diagram showing another variant.

In the variant shown in FIGS. 10, 11*a* and 11*b* the connector 60' includes, as in the example previously described, an outer sleeve 70' connected to ground, a core 75' and a non-linear material 78'.

This example differs from the previous one mainly in a different configuration of the core, the latter having a polygon-shape section (FIGS. 11*a* and 11*b*), preferably a regular polygon shape. In the example the polygon has twelve sides.

It is the vertices of the polygon (which are edges in space) that confer the spike effect, i.e. that enable breakdown of the material 78' for an external electric field significantly lower than its intrinsic triggering threshold (change from insulative state to conductive state).

Each cell $\mathbf{72'}_1$, $\mathbf{72'}_2$, is divided into sub-cells. The cell $\mathbf{72'}_1$ includes two sub-cells $\mathbf{85}_1$ and $\mathbf{85}_2$ of equal length and the cell $\mathbf{72'}_2$ comprises three sub-cells $\mathbf{86}_1$, $\mathbf{86}_2$ and $\mathbf{86}_3$, all of the same length. The section of the core for two successive sub-cells forming part of the same cell is the same, but with an angular offset. This angular offset about the axis of the connector 60' is preferably equal to half the angle subtended at the center by each side of the polygon (30° in the example), as shown in FIGS. 11*a* and 11*b*. The aim of this is to homogenize the spatial distribution of the edges in order to reduce local heating of the dielectric material and, most importantly, to limit the risk of electrical arcing between the edges and the outer conductor.

The examples described hereinabove concern a distribution of impedances in the longitudinal direction which has the aim of using impedance gradients or discontinuities to reduce coupling between interference waves and the downstream end of the cable or connector.

In the example shown in FIG. 12, the impedance gradients are obtained by providing a cable having around the core 90 a plurality of dielectric layers 91, 92, 93, etc the permittivities of which differ in such a manner as to create said impedance discontinuities that limit or eliminate coupling between external interference 95 and the core 90.

For example, the layer 93 is of polyaniline, the layer 92 is of polyethylene and the layer 91 is a conductive polymer. The layer 91 is a doped conductive polymer. Its conductivity is between 1 S/cm and 1000 S/cm. This doped conductive polymer is advantageously a doped polyaniline. The dopant is hydrochloric acid, sulfuric acid, camphrosulfonic acid or a substituted sulfonic acid, for example. The nature of the layer 91 is open to many variants.

The invention is not limited to a cable with only one conductor. It also encompasses the protection of a set of cables. For example, it can be applied to the protection of a pair of telephone transmission cables, as shown in FIG. 13.

The two telephone cables 101 and 102 are disposed in a jacket 103 filled with dielectric materials alternating in the longitudinal direction. The figure shows the boundary 111 between two cells $\mathbf{110}_1$ and $\mathbf{110}_2$. The first cell $\mathbf{110}_1$ includes an insulator in the form of phenolic resin the relative permittivity of which is 5 and the second cell $\mathbf{110}_2$ includes a polyethylene that is relative conductive with a permittivity of 2.3. As in the embodiments previously described, this variation of the permittivity of the dielectric at a surface 111 perpendicular to the axis 104 produces a steep impedance gradient limiting coupling for the interference. There is preferably a succession of cells such that interference filtering is achieved in the manner described above.

Each cable 101 or 102 includes, around each wire 103, a conductive polymer 105 which has the advantage of dissipating interference waves in the form of heat, in addition to the reduced coupling due to the impedance discontinuities.

It is naturally not indispensable for the conductors 101 and 102 to be parallel, as shown here. They can be twisted to limit differential mode interference.

There is claimed:

1. An electrical signal transmission device including a core and an outer conductor separated by a dielectric wherein, to eliminate external radiated interference, for which said device acts as a receiving antenna for said external radiated interference, said outer conductor features discontinuities forming impedance discontinuities, a set of discontinuities being chosen to prevent propagation towards said core of external interference waves in a particular range of frequencies, wherein said outer conductor is subdivided in an axial direction into alternating sections, at least one first section of said alternations having an outer conductor covering a first amount of the outer periphery of said dielectric and at least one second section of said alternations having an outer conductor covering a second amount of the outer periphery of said dielectric, wherein one of said first section and said second section having at least one aperture and where said first and second sections are electrically connected.

2. The device claimed in claim 1 wherein said outer conductor features discontinuities forming a plurality of successive different impedances, dimensions of the impedances formed between successive discontinuities having varying values forming a sequence filtering waves that can propagate towards said core which have frequencies in a particular range imposed by said sequence.

3. The device claimed in claim 1 wherein said first sections of said alternations have varying lengths in said axial direction.

4. The device claimed in claim 2 wherein said succession of discontinuities forms interference filters eliminating frequencies in said particular range.

5. The device claimed in claim 1 wherein said particular range is between 1 kHz and 18 GHz.

6. The device claimed in claim 1 wherein said at least one second section includes a plurality of second sections of said alternations have varying lengths in said axial direction.

7. The device claimed in claim 6 wherein said second sections outer conductor is in the form of a wire parallel to an axis of said device and connecting said outer conductors of adjacent elements.

8. The device claimed in claim 1 wherein said outer conductor is a metal tape.

9. The device claimed in claim 1 wherein said outer conductor is a varnish.

10. The device claimed in claim 1 wherein said dielectric becomes conductive from a particular electric field threshold.

11. The device claimed in claim 2 wherein said set of discontinuities comprise only two significantly different values in said succession of impedances.

12. The device claimed in claim 1 wherein successive impedance values are in a ratio at least equal to four and preferably in the order of ten.

13. A device as claimed in claim 1 wherein said device is a cable.

14. A method of protecting an electrical signal transmission device against external radiated electromagnetic interference, said device having a core and an outer conductor separated by a dielectric wherein said outer conductor has discontinuities forming impedance discontinuities, a set of discontinuities being chosen to prevent propagation towards said core of external interference waves in a particular range of frequencies, wherein said outer conductor is subdivided in an axial direction into alternating sections, at least one first section of said alternations having an outer conductor covering a first amount of the outer periphery of said dielectric and at least one second section of said alternations having an outer conductor covering a second amount of the outer periphery of said dielectric, where said first and second sections are electrically connected, wherein one of said first section and said second section having at least one aperture and where said first and second sections are electrically connected.

15. The method claimed in claim 14 wherein said discontinuities form a plurality of successive different impedances, where dimensions conferred upon the impedances formed between successive discontinuities having values varying in accordance with a sequence for filtering waves that can propagate towards the core which have frequencies in a particular range imposed by said sequence.

* * * * *